(12) United States Patent
McCallum

(10) Patent No.: US 9,483,303 B2
(45) Date of Patent: Nov. 1, 2016

(54) DIFFERENTIAL STACK-BASED SYMMETRIC CO-ROUTINES

(75) Inventor: Nathaniel McCallum, Nicholasville, KY (US)

(73) Assignee: Red Hat, Inc., Raleigh, NC (US)

(*) Notice: Subject to any disclaimer, the term of this patent is extended or adjusted under 35 U.S.C. 154(b) by 1037 days.

(21) Appl. No.: 13/408,922

(22) Filed: Feb. 29, 2012

(65) Prior Publication Data

US 2013/0227254 A1 Aug. 29, 2013

(51) Int. Cl.
*G06F 9/46* (2006.01)
*G06F 9/48* (2006.01)

(52) U.S. Cl.
CPC ............. *G06F 9/462* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 5,003,466 A * | 3/1991 | Schan et al. | 714/41 |
| 5,418,942 A * | 5/1995 | Krawchuk et al. | |
| 2006/0026312 A1* | 2/2006 | Chauvel | 710/23 |
| 2006/0277540 A1* | 12/2006 | Bhattacharya | 717/174 |
| 2008/0222401 A1* | 9/2008 | Dewey et al. | 712/228 |
| 2011/0107426 A1* | 5/2011 | Yen et al. | 726/26 |

* cited by examiner

*Primary Examiner* — William B Partridge
(74) *Attorney, Agent, or Firm* — Lowenstein Sandler LLP

(57) ABSTRACT

A computing device initiates execution of a first co-routine on the computing device. The first co-routine utilizes an execution stack in a memory of the computing device. A differential symmetric co-routine module pauses execution of the first co-routine and, subsequently, resumes execution of the first co-routine utilizing the same execution stack.

18 Claims, 5 Drawing Sheets

DIFFERENTIAL STACK-BASED SYMMETRIC CO-ROUTINES

TECHNICAL FIELD

This disclosure relates to the field of computer application programs and, in particular, to differential stack-based symmetric co-routines.

BACKGROUND

Asynchronous programming includes events occurring independently of the main program flow, allowing the main program flow to continue processing. In stack-based programming languages, such as the C programming language and many derivative languages, asynchronous programming may be very difficult. Since each function in a program can only return once, if the program performs a task (e.g., by calling a function) that will block the processing device for a relatively long period of time, then the task may be divided into smaller functions. As the complexity of the task increases, so does the number of functions and the degree of complexity of state (e.g., the contents of processing device registers) which must be maintained between these functions. Further, since this state cannot be stored on the main processing stack it is put into other currently unallocated memory (e.g., the heap), which requires the programmer or administrator to manage the life-cycle of the state. Conventionally, this complex asynchronous programming has been solved by executing portions of the program code in parallel via processing threads. Parallel execution, however, may present problems, including the synchronization of state between the parallel stacks.

Incremental processing includes recomputing, by a program, only those outputs that depend on a piece of changed data, rather than recomputing all of the outputs. The problem with incremental processing is closely related to that of asynchronous programming. Take for example, a function which returns a number of results in response to a query. If the number of results is small, the program need only allocate a small portion of memory to hold these results. The program also only uses the resources needed to load the small number of results. The resources may include processing device usage, disk/network input/out put (I/O), etc. If, however, the caller of the function only needs to know the first result (or one or more other early result(s)) for example, the resources used to acquire all of the remaining results have been wasted. For queries that return a large number of results, the amount of time and resources wasted can become significant. This problem becomes increasingly acute when dealing with low-memory devices, such as mobile phones, set-top boxes, virtual machines, etc., which lack the higher level language constructs such as symmetric co-routines which would allow a program to incrementally call the function and get just one (or a few) result per call.

BRIEF DESCRIPTION OF THE DRAWINGS

The present disclosure is illustrated by way of example, and not by way of limitation, in the figures of the accompanying drawings.

DETAILED DESCRIPTION

Figure 1:
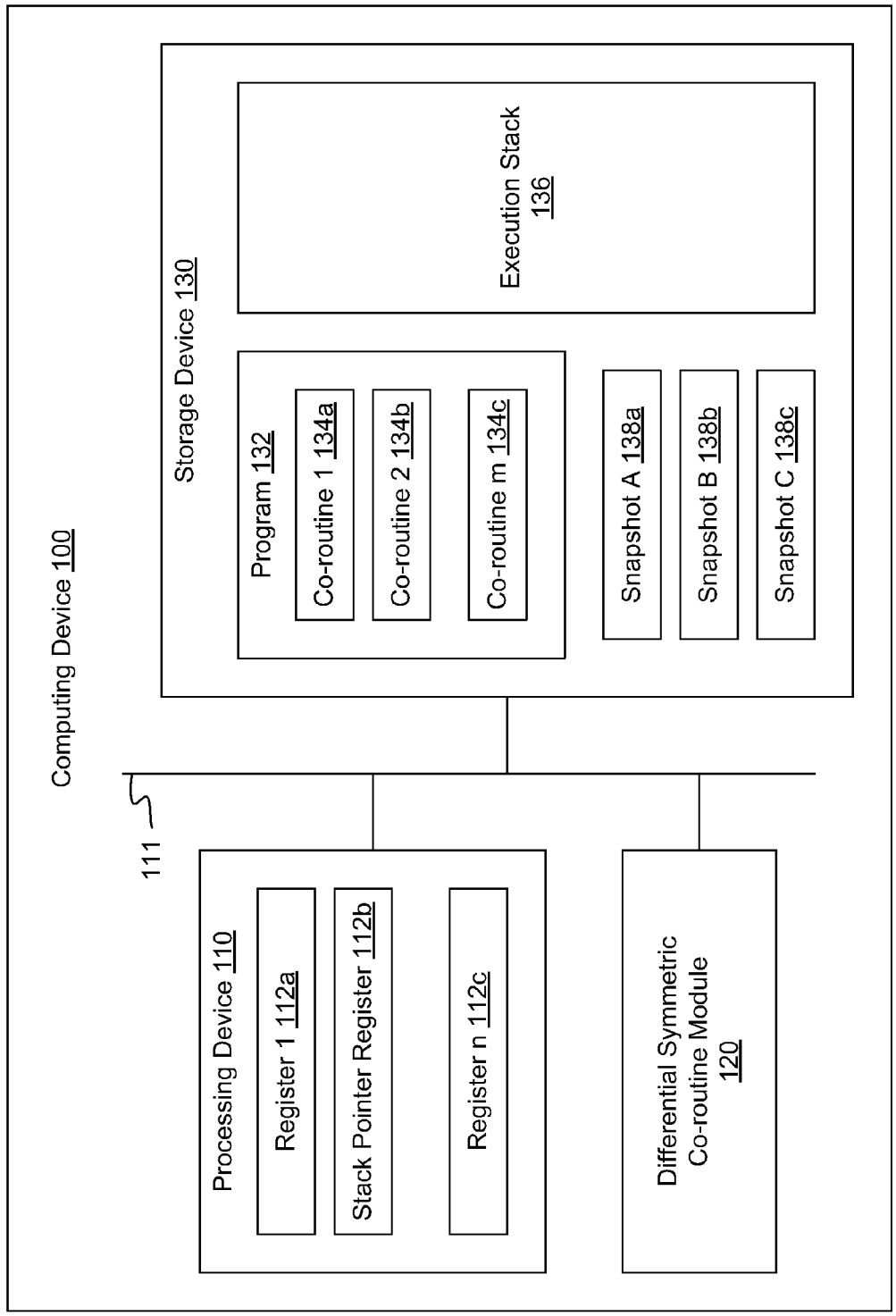
FIG. 1 is a block diagram illustrating a computing device for implementing differential stack-based symmetric co-routines, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for implementing differential stack-based symmetric co-routines. In one embodiment, a computing device initiates execution of a first co-routine on the computing device. The first co-routine utilizes an execution stack in a memory of the computing device. A differential symmetric co-routine module may pause execution of the first co-routine and, subsequently, resume execution of the first co-routine utilizing the same execution stack.

In one embodiment, prior to initiating execution of the first co-routine, the differential symmetric co-routine module may save a first snapshot of an execution context of the computing device. The execution context may include a state of a plurality of processor registers. One of the plurality of processor registers may include a stack pointer register identifying a location in the execution stack. In the first snapshot, the stack pointer register may identify a first location in the execution stack corresponding to the current point of execution. In response to pausing execution of the first co-routine, the differential symmetric co-routine may save a second snapshot of the execution context of the computing device. In the second snapshot, the stack pointer register may identify a second location in the execution stack corresponding to the then current point of execution. As part of pausing the execution of the first co-routine, the differential symmetric co-routine module may also save a copy of a region of the execution stack between the first location from the first snapshot and the second location from the second snapshot. The differential symmetric co-routine module may also reset the execution context of the computing device based on the first snapshot, by loading the saved values from the snapshot into the processor registers.

After pausing the execution of the first co-routine, the computing device may initiate execution of a second co-routine or other function on the computing device. The second co-routine or other function may utilize the same execution stack. Subsequently, execution of the second co-routine or other function may pause or finish. In response to pausing execution of the second co-routine, the differential symmetric co-routine may save a third snapshot of the execution context of the computing device. The differential symmetric co-routine module may reset the execution context of the computing device based on the second snapshot, by loading the saved values from the snapshot into the processor registers. The differential symmetric co-routine module may insert the copy of the region of the execution stack back into the execution stack at the first location. This may allow the first co-routine to resume execution in the same execution stack.

Many conventional techniques include executing asymmetric co-routines in separate stacks. These technique may cause failures in many debugging tools, because the tools may to be configured to handle with multiple execution stacks. The techniques described herein for differential stack-based symmetric co-routines allow execution in the main program stack, and thus, will not confuse debugging tools. In addition, using separate execution stacks means that the full size of the stack must be pre-allocated from memory for each co-routine. An example system may have an eight megabyte (MB) execution stack. In that system, running 10 co-routines with the same stack could result in 88 MB of allocated address space; the vast majority of which will go unused. By comparison, a typical address space usage for differential co-routines may be approximately 10 MB in the same scenario.

Due to the attempt to utilize asymmetric co-routines, interoperability with the vast body of existing code libraries is very low. By comparison, the differential techniques described herein have medium-to-high interoperability with this same body of existing code libraries. Furthermore, the ability to suspend execution across code calls of pre-existing code is preserved in the differential technique. Many conventional techniques will require that code for a given library execute only in one of many stacks. In addition, symmetric co-routines result in code that is much easier to read, debug and maintain than asymmetric co-routines (i.e., stackless co-routines).

Implementing differential stack-based symmetric co-routines may involve a nominal period of time for copying a region of the execution stack to an unused memory space (e.g., the heap), however, since the technique involves only a differential copy, rather than a copy of the whole stack, the size of the copy is generally small. Thus, the time delay may be offset by a significant savings of storage resources. In addition, since no system call is needed for this operation, the implementation of differential stack-based symmetric co-routines may still be much faster than other methods which do require a system call.

FIG. 1 is a block diagram illustrating a computing device for implementing differential stack-based symmetric co-routines, according to an embodiment of the present invention. In one embodiment, computing device 100 may include, for example, computer system 500 of FIG. 5. Computing device 100 may include any type of computing device, such as a client device, a server device, a user device, or some other device.

In one embodiment, computing device 100 may include processing device 110, differential symmetric co-routine module 120 and storage device 130. These various components of computing device 100 may be connected together via bus 111. Bus 111 may be a common system bus, including one or more different buses, or may be one or more single signal lines between individual system components.

Processing device 110 may include one or more general-purpose processing devices such as a microprocessor, central processing unit, or the like. More particularly, processing device 110 may be a complex instruction set computing (CISC) microprocessor, a reduced instruction set computer (RISC) microprocessor, a very long instruction word (VLIW) microprocessor, a processor implementing other instruction sets, or processors implementing a combination of instruction sets. Processing device 110 may also be one or more special-purpose processing devices such as an application specific integrated circuit (ASIC), a field programmable gate array (FPGA), a digital signal processor (DSP), network processor, or the like. In one embodiment, processing device 110 includes one or more processor registers 112a-112c. Processor registers 112a-112c may include an amount of storage available as part of processing device 110. Processor registers 112a-112c may be addressed by mechanisms other than main memory and can be accessed more quickly. Computing device 100 may load data from a larger memory (e.g., storage device 130) into processor registers 112a-112c where the data may be used for arithmetic, manipulated, or tested, by some machine instruction. Examples of the types of registers included in processor registers 112a-112c include user-accessible registers, data registers, address registers, conditional registers, and special-purpose registers. One example of an address register is stack pointer register 112b, which may include a pointer indicating a current location in an execution stack 136 allocated in memory (e.g., storage device 130).

Storage device 130 may include one or more mass storage devices which can include, for example, flash memory, magnetic or optical disks, or tape drives, read-only memory (ROM); random-access memory (RAM); erasable programmable memory (e.g., erasable programmable read only memory (EPROM) and electrical erasable programmable read only memory (EEPROM)); flash memory; or any other type of storage medium. In one embodiment, storage device 130 includes one or more computer application programs, such as program 132. Program 132 may include a series of instructions to perform certain tasks by executing functions. In one embodiment, the functions include co-routines 134a-134c. Co-routines 134a-134 c may be computer program components that generalize subroutines to allow multiple entry points for suspending and resuming execution at certain locations. Co-routines 134a-134c may execute within execution stack 136, which may be provisioned within storage device 130. During execution, co-routines 134a-134c may exit by yielding to, or calling, other co-routines or other functions, which allows co-routines 134a-134c to be re-entered at the same point in the future.

In one embodiment, computing device may additionally include differential symmetric co-routine module 120. Differential symmetric co-routine module 120 may may implement a method, as described below, to execute co-routines, such as co-routines 134a-134c in a single execution stack 136, which may be the main program stack used by program 132. In some embodiments, differential symmetric co-routine module 120 may take snapshots 138a-138c of the execution context of program 132, including the status of processor registers 112a-112c, at various points during the execution of co-routines 134a-134c. Snapshots 138a-138c may include a copy of all or a portion of the state of computing device 100 at a particular point in time. These snapshots 138a-138c may be used to pause and resume execution of co-routines 134a-134c without provisioning a second program stack. In one embodiment, in addition to the status of processor registers 112a-112c, the snapshots 138a-138c may include one or copies of a region or regions of execution stack 136. These regions may be overwritten in execution stack 136 and then replaced when the original co-routine is resumed. Additional details of differential symmetric co-routine module 120 will be described below with respect to FIGS. 2-4.

Figure 2:
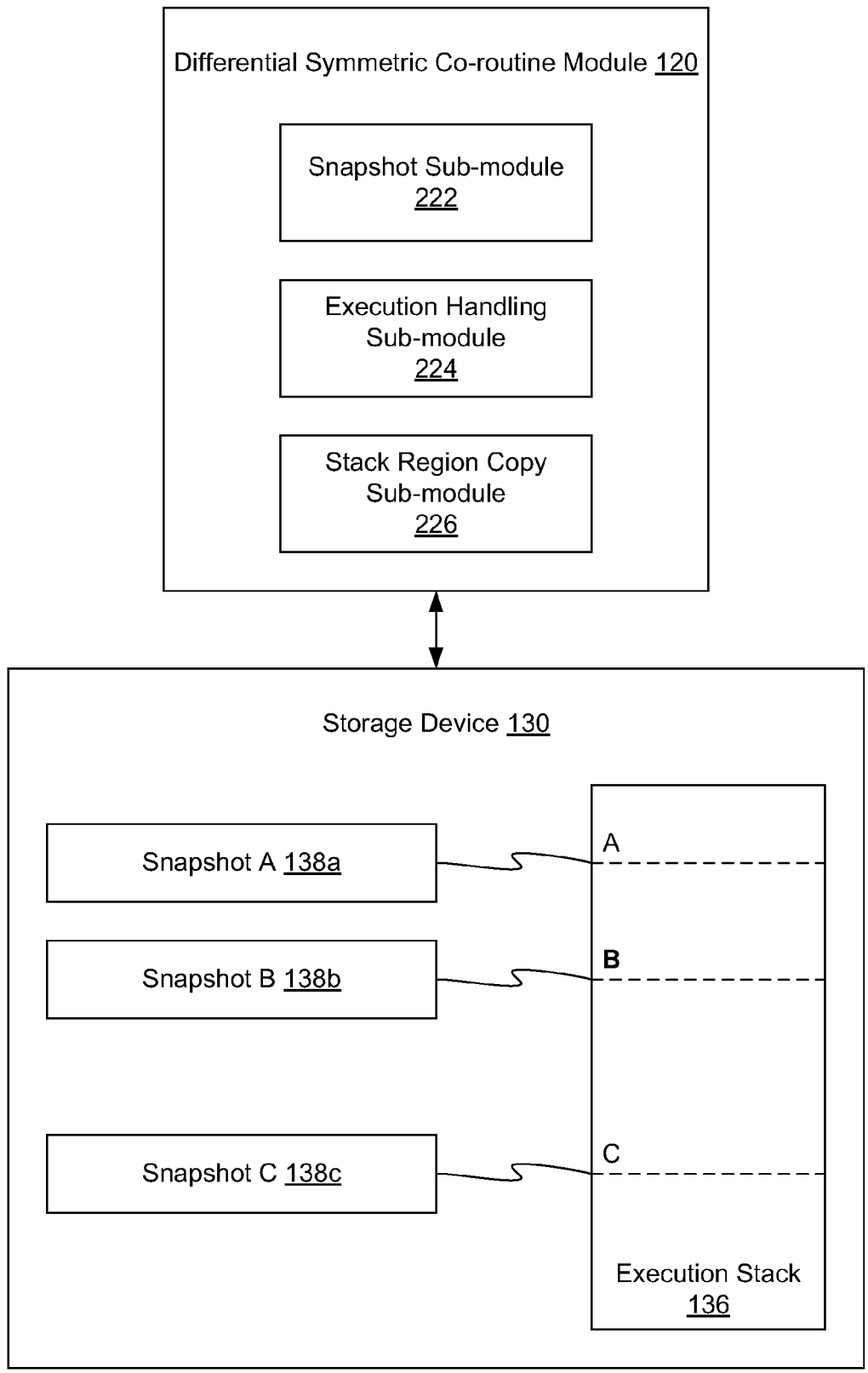
FIG. 2 is a block diagram illustrating a differential symmetric co-routine module, according to an embodiment.

FIG. 2 is a block diagram illustrating a differential symmetric co-routine module, according to an embodiment of the present invention. In one embodiment, differential symmetric co-routine module 120 includes snapshot sub-module 222, execution handling sub-module 224 and stack region copy sub-module 224. Differential symmetric co-routine module 120 may be coupled to storage device 130, which may include execution stack 136 and snapshots 138a-138c.

In one embodiment, when a computer application program, such as program 132 calls a co-routine, such as co-routine 1 134a, snapshot sub-module 222 may save a snapshot of the current execution context, including the status of processor registers 112a-112c. In one embodiment, snapshot sub-module 222 may save the snapshot as snapshot A 138a in storage device 130. In one embodiment, in snapshot A 138a, the contents of stack pointer register 112b may include a value pointing to the current location A in execution stack 136.

In general, it is at a programmer's discretion, based upon his knowledge of what operations will occur within a function, whether to implement the function as a co-routine and cause snapshot sub-module 222 to save the snapshot A 138a. For example, if a function might read data from a network, a co-routine may be highly desirable. However, if the function just performs a simple task (e.g., adding two parameters together), there may be more overhead in preparing the co-routine and executing the co-routine than in the function call itself. Thus, the decision to implement a function as a co-routine may be based upon estimated resources required to complete the function, such as processor usage (workload division), I/O (file descriptor polling) or memory (iterators).

In addition, if the execution of co-routine 1 134a is paused, snapshot sub-module 222 may save a second snapshot of the execution context at that point in time. In one embodiment, snapshot sub-module 222 may save the second snapshot as snapshot B 138b in storage device 130 and the stack pointer register 112b may be pointing to location B in execution stack 136.

Execution handling sub-module 224 may handle execution of co-routines 134a-134c from program 132. In one embodiment, in response to a call by program 132, execution handling sub-module 224 may instruct processing device 110 to begin execution of co-routine 1 134a. The execution of co-routine 1 134a may begin at location A in execution stack 136. At the time when co-routine 1 134a is to be paused, execution handling sub-module 224 may instruct processing device 110 to pause execution of co-routine 1 134a. This pause may occur when processing has proceeded to location B in execution stack 136. At this point, execution handling sub-module 224 may instruct processing device 110 to begin execution of another function, such as co-routine 2 134b. Execution handling sub-module 224 may similarly handle execution of co-routine 2 134b and any other co-routines or functions.

Stack region copy sub-module 226 may be configured to copy regions of execution stack 136 into memory, such as storage device 130, for later use in resuming a paused co-routine. For example, when execution handling sub-module 224 executes co-routine 1 134a beginning at location A in execution stack 136 and pauses execution of co-routine 1 134a at location B in execution stack 136, in response to the pausing, stack region copy sub-module 226 may copy the region of execution stack 136 between locations A and B. Stack region copy sub-module 226 may store the copy of this region as part of snapshot B 138b, may associate the copy with snapshot B 138b, or may store the copied region separately within storage device 130 or some other storage device. Additional details of differential snapshot sub-module 222, execution handling sub-module 224 and stack region copy sub-module will be described below with respect to FIGS. 3 and 4.

Figure 3:
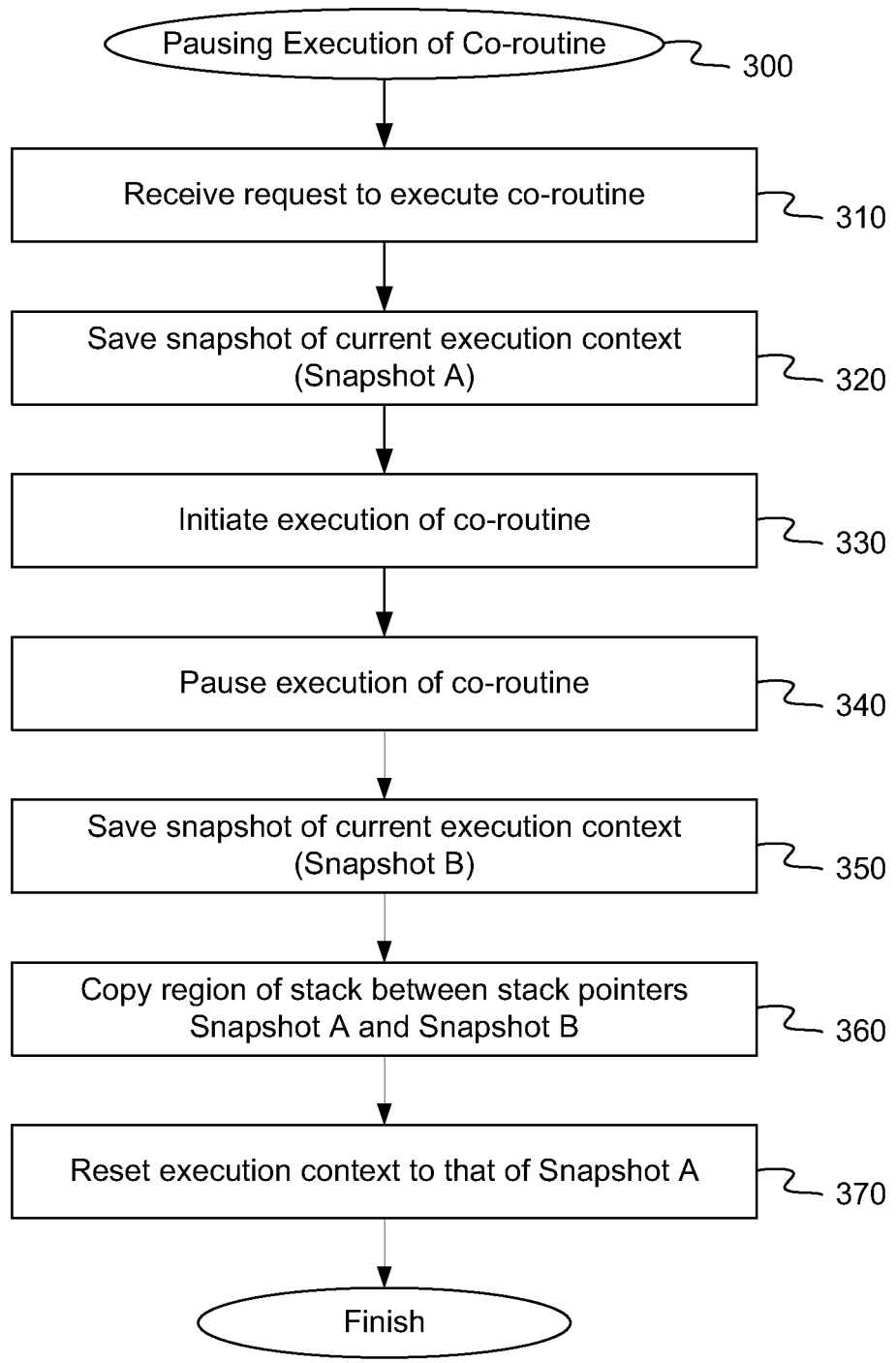
FIG. 3 is a flow diagram illustrating a method for pausing execution of a co-routine, according to an embodiment.

FIG. 3 is a flow diagram illustrating a method for pausing execution of a co-routine, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 can pause execution of a co-routine in a manner that allows the co-routine to be resumed, at a later time, in the same execution stack. In one embodiment, method 300 may be performed by differential symmetric co-routine module 120 as shown in FIGS. 1 and 2.

Referring to FIG. 3, at block 310, method 300 receives a request to execute a co-routine, such as co-routine 1 134a. In one embodiment, differential symmetric co-routine module 120 may receive a request from program 132 to execute co-routine 1 134a on processing device 110. In response to receiving the request, at block 320, method 300 saves a snapshot of the current execution context. In one embodiment, snapshot sub-module 222 of differential symmetric co-routine module 120 may save the snapshot as snapshot A 138a in storage device 130. Snapshot A 138a may include the values in processor registers 112a-112c. In one embodiment, the contents of stack pointer register 112b may include a value pointing to the current location A in execution stack 136.

At block 330, method 300 initiates execution of co-routine 1 134a by processing device 110. In one embodiment, execution handling sub-module 224 may make a function call to initiate the execution. Co-routine 1 134a may make use of allocated memory in execution stack 136 beginning at location A.

At block 340, method 300 may pause execution of co-routine 1 134a. In one embodiment, execution handling sub-module 224 may receive an indication (e.g., an interrupt request) from program 132 to pause the co-routine and may send an instruction to processing device 110 causing processing device 110 to pause execution of the co-routine. In response to pausing the co-routine, at block 350, method 300 saves a second snapshot of the current execution context. In one embodiment, snapshot sub-module 222 may save the snapshot as snapshot B 138b in storage device 130. Snapshot B 138b may include the values in processor registers 112a-112c, and the contents of stack pointer register 112b may include a value pointing to the current location B in execution stack 136.

At block 360, method 300 copies a region of execution stack 136 between the locations specified in stack pointer register 112b for snapshot A 138a and snapshot B 138b. In one embodiment, stack region copy sub-module 226 of differential symmetric co-routine module 120 may copy the region of execution stack 136 between locations A and B. Stack region copy sub-module 226 may store the copy of this region as part of snapshot B 138b, may associated the copy with snapshot B 138b, or may store the copied region separately within storage device 130 or some other storage device. At block 370, method 300 may reset the execution context to that contained in snapshot A 138a. Snapshot sub-module 222 may read the values of the processor registers from snapshot A 138a and load them back into processor registers 112a-112c. This may return the execution context (or state) of computing device 100 back to the execution context before the execution of co-routine 1 134a was initiated. This may allow the execution of another co-routine, such as co-routine 2 134b, or some other function, while preserving the ability to resume execution of co-routine 1 134*a* at the point at which its execution was paused.

Figure 4:
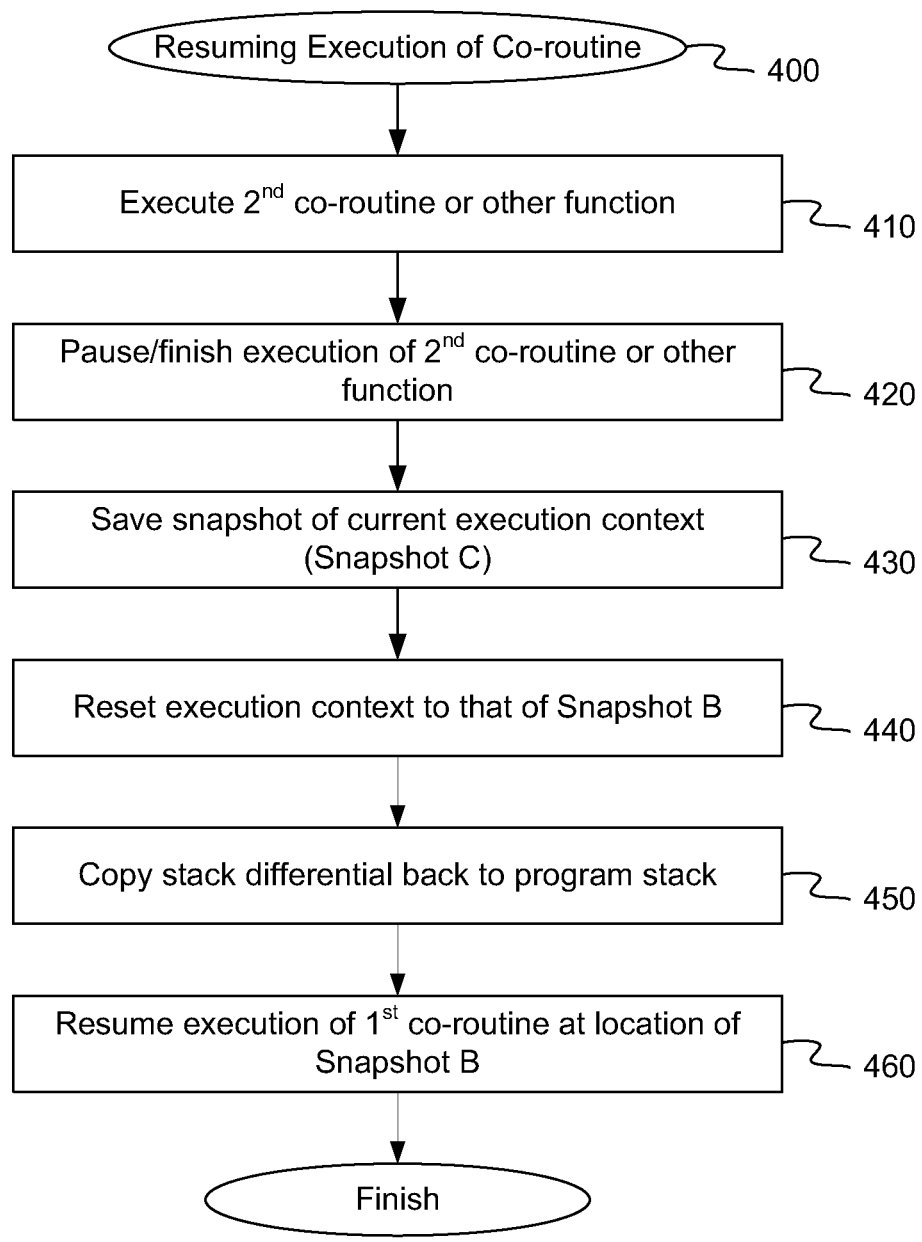
FIG. 4 is a flow diagram illustrating a method for resuming execution of a co-routine, according to an embodiment.

FIG. 4 is a flow diagram illustrating a method for resuming execution of a co-routine, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can resume execution of a paused co-routine in the same execution stack in which it was previously executing. In one embodiment, method 400 may be performed by differential symmetric co-routine module 120 as shown in FIGS. 1 and 2.

Referring to FIG. 4, at block 410, method 400 initiates execution of a second co-routine, such as co-routine 2 134*b*, or other function. In response to the execution of co-routine 1 134*a* being paused, in one embodiment, execution handling sub-module 224 may initiate the execution of co-routine 2 134*b* by processing device 110. At block 420, method 400 may pause and/or finish execution of co-routine 2 134*b* or the other called function. In one embodiment, execution handling sub-module 224 may receive an indication, such as an interrupt request, from program 132 to pause the co-routine and may send an instruction to processing device 110 causing processing device 110 to pause execution of the co-routine.

In response to pausing or finishing co-routine 2 134*b*, at block 430, method 400 saves a third snapshot of the current execution context. In one embodiment, snapshot sub-module 222 may save the snapshot as snapshot C 138*c* in storage device 130. Snapshot C 138*c* may include the values in processor registers 112*a*-112*c*, and the contents of stack pointer register 112*b* may include a value pointing to the current location C in execution stack 136.

At block 440, method 400 may reset the execution context to that contained in snapshot B 138*b*. Snapshot sub-module 222 may read the values of the processor registers from snapshot B 138*b* and load them back into the processor registers 112*a*-112*c*. This may return the execution context of computing device 100 back to that when co-routine 1 134*a* was paused and before the execution of co-routine 2 134*b* was initiated. In one embodiment, this may be referred to as "expanding" the stack 136 back to its previous location.

At block 450, method 400 copies the stack differential back to program stack 136 at the appropriate location. In one embodiment, stack region copy sub-module 226 of differential symmetric co-routine module 120 may identify the copied region associated with snapshot B 138*b* stored within storage device 130 (i.e., the region between locations A and B that was written by co-routine 1 134*a*). Stack region copy sub-module 226 may copy the region back into execution stack 136 at the appropriate location. In one embodiment, the region is copied back between locations A and B in execution stack 136. This region represents the portion of execution stack 136 that was previously written by co-routine 1 134*a* that may have been changed or rewritten during the execution of co-routine 2 134*b*.

At block 460, method 400 resumes execution of co-routine 1 134*a* at the location B of snapshot B 138*b*. In one embodiment, execution handling sub-module 224 instructs processing device 110 to resume execution of co-routine 1 134*a*. In one embodiment, execution of co-routine 1 134*a* may resume at location B in the execution stack 136 or at some other location further down the stack (or higher in the stack if processing occurs from bottom up). In another embodiment, the execution stack 136 may be padded before function calls or made. Padding may include jumping down a predetermined amount of space in the execution stack 136 in between function calls. For example if snapshot A 138*a* is taken when processing is at location A, in one embodiment, execution of co-routine 1 may begin at a location further down (i.e., location A1), rather than at location A. In this embodiment, co-routine 1 134*a* may be resumed at a location in execution stack 136 between location A and location A1.

In another embodiment, either before or instead of resuming execution of co-routine 1 134*a* after pausing co-routine 2 134*b*, differential symmetric co-routine module 120 may save snapshot C 138*c* and copy the region of execution stack 136 between locations A and C. Stack region copy sub-module 226 may associate this copy with snapshot C 138*c*. In one embodiment, snapshot C 138*c* may replace (i.e., be written over snapshot A 138*a*). In another embodiment, however, snapshot C 138*c* may be stored at a different location in memory, so that past snapshots (e.g., snapshot A 138*a*) may be maintained. Execution handling sub-module 224 may initiate execution of another co-routine, such as co-routine m 134*c*. This process of capturing snapshots and copying regions of execution stack 136 may continue, until program 132 desires to resume execution of a previously paused co-routine. At that point, the co-routine may be resumed according to the description above with respect to method 400.

Figure 5:
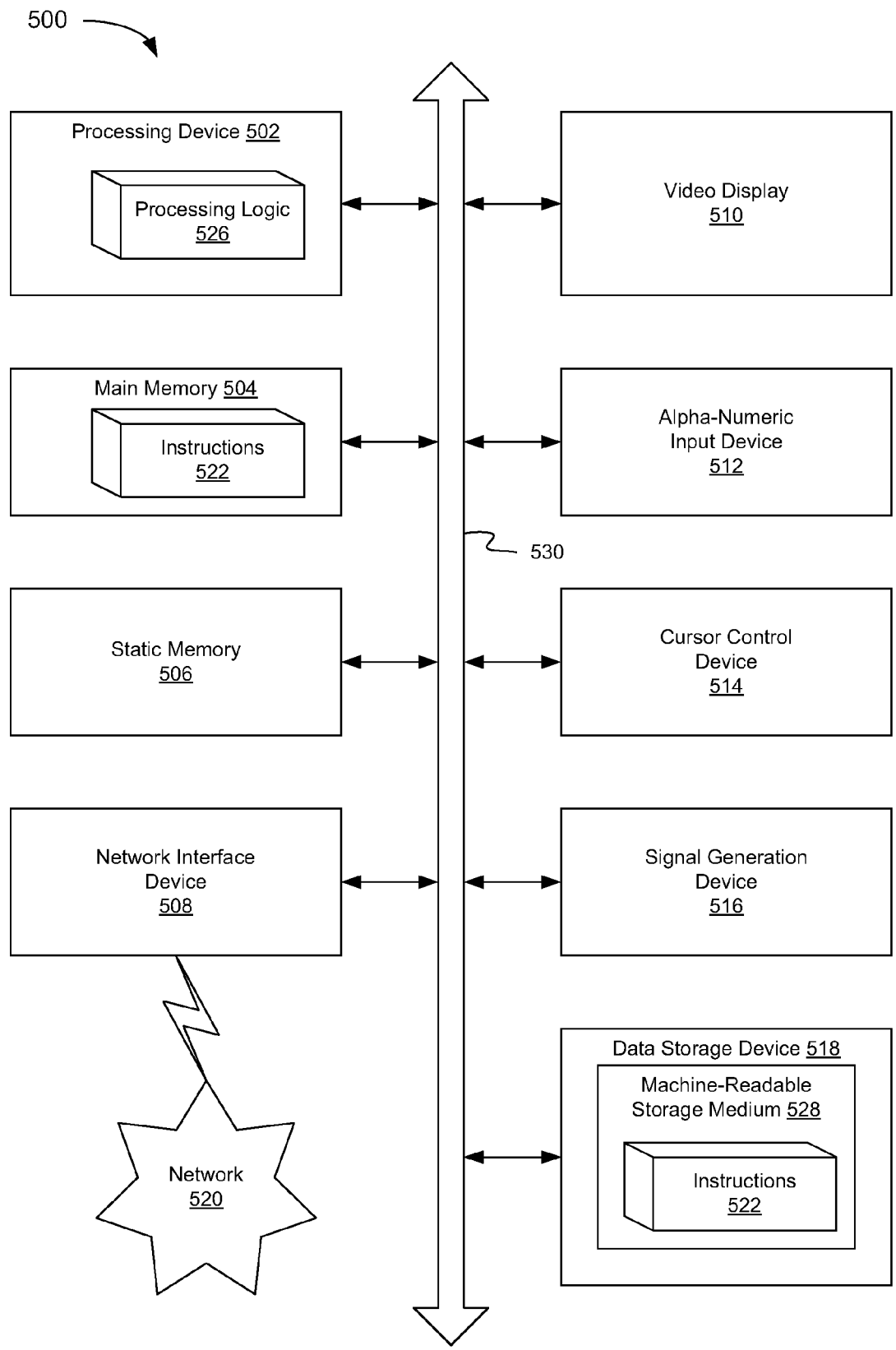
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a computing device, such as computing device 100, running differential symmetric co-routine module 120.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method for pausing and resuming a co-routine in the same execution stack, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., compact disk read only memory (CD-ROM)); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    initiating execution of a first co-routine on a computing device, wherein the first co-routine utilizes an execution stack;
    pausing execution of the first co-routine;
    generating a copy of a first region of the execution stack, the first region including a portion of the execution stack between a first location associated with the initiating execution of the first co-routine and a second location associated with pausing execution of the first co-routine, the first region excluding other portions of the execution stack;
    initiating execution of a second co-routine on the computing device, wherein the second co-routine utilizes the execution stack;
    pausing execution of the second co-routine;
    inserting, by a processing device, the copy of the first region into the execution stack at the first location; and
    resuming, by the processing device, execution of the first co-routine at the second location in the execution stack.

2. The method of claim 1, further comprising:
    saving a first snapshot of an execution context of the computing device prior to initiating execution of the first co-routine; and
    in response to pausing execution of the first co-routine, saving a second snapshot of the execution context of the computing device.

3. The method of claim 2, wherein the execution context comprises a state of a plurality of processor registers, and wherein one of the plurality of processor registers comprises a stack pointer register identifying a location in the execution stack.

4. The method of claim 3, wherein for the first snapshot, the stack pointer register identifies the first location in the execution stack, and for the second snapshot, the stack pointer register identifies the second location in the execution stack.

5. The method of claim 4, further comprising:
    resetting the execution context of the computing device in view of the first snapshot.

6. The method of claim 5, wherein resuming execution of the first co-routine comprises:
    in response to pausing execution of the second co-routine, saving a third snapshot of the execution context of the computing device; and
    resetting the execution context of the computing device in view of the second snapshot.

7. A computing device comprising:
    a memory; and
    a processing device, operatively coupled to the memory, the processing device to:
        initiate execution of a first co-routine on the computing device, wherein
        the first co-routine utilizes an execution stack in the memory;
        pause execution of the first co-routine;
        generate a copy of a first region of the execution stack, the first region including a portion of the execution stack between a first location associated with the initiating execution of the first co-routine and a second location associated with pausing execution of the first co-routine, the first region excluding other portions of the execution stack;
        initiate execution of a second co-routine on the computing device, wherein the second co-routine utilizes the execution stack;
        pause execution of the second co-routine;
        insert the copy of the first region into the execution stack at the first location; and
        resume execution of the first co-routine at the second location in the execution stack.

8. The computing device of claim 7, the processing device further to:
   save a first snapshot of an execution context of the computing device prior to initiating execution of the first co-routine; and
   in response to pausing execution of the first co-routine, save a second snapshot of the execution context of the computing device.

9. The computing device of claim 8, wherein the execution context comprises a state of a plurality of processor registers, and wherein one of the plurality of processor registers comprises a stack pointer register identifying a location in the execution stack.

10. The computing device of claim 9, wherein for the first snapshot, the stack pointer register identifies the first location in the execution stack, and for the second snapshot, the stack pointer register identifies the second location in the execution stack.

11. The computing device of claim 10, the processing device further to:
   reset the execution context of the computing device in view of the first snapshot.

12. The computing device of claim 7, when resuming execution of the first co-routine comprises, the processing device further to:
   in response to pausing execution of the second co-routine, save a third snapshot of the execution context of the computing device;
   reset the execution context of the computing device in view of the second snapshot; and
   copy the copy of the region of the execution stack back into the execution stack at the first location.

13. A non-transitory machine-readable storage medium storing instructions which, when executed, cause a processing device to:
   initiate execution of a first co-routine on the data processing system, wherein the first co-routine utilizes an execution stack;
   pause execution of the first co-routine;
   generate, by the processing device, a copy of a first region of the execution stack, the first region including a portion of the execution stack between a first location associated with the initiating execution of the first co-routine and a second location associated with pausing execution of the first co-routine, the first region excluding other portions of the execution stack;
   initiate execution of a second co-routine on the computing device, wherein the second co-routine utilizes the execution stack;
   pause execution of the second co-routine;
   insert the copy of the first region into the execution stack at the first location; and
   resume, by the processing device, execution of the first co-routine utilizing the execution stack.

14. The non-transitory machine-readable storage medium of claim 13, wherein the processing device is further to:
   save a first snapshot of an execution context of the data processing system prior to initiating execution of the first co-routine; and
   in response to pausing execution of the first co-routine, save a second snapshot of the execution context of the data processing system.

15. The non-transitory machine-readable storage medium of claim 14, wherein the execution context comprises a state of a plurality of processor registers, and wherein one of the plurality of processor registers comprises a stack pointer register identifying a location in the execution stack.

16. The non-transitory machine-readable storage medium of claim 15, wherein for the first snapshot, the stack pointer register identifies the first location in the execution stack, and for the second snapshot, the stack pointer register identifies the second location in the execution stack.

17. The non-transitory machine-readable storage medium of claim 16, wherein the processing device is further to:
   reset the execution context of the computing device in view of the first snapshot.

18. The non-transitory machine-readable storage medium of claim 13, wherein to resume execution of the first co-routine, the processing device to:
   in response to pausing execution of the second co-routine, save a third snapshot of the execution context of the computing device; and
   reset the execution context of the computing device in view of the second snapshot.

* * * * *